United States Patent
Michel et al.

(10) Patent No.: US 10,621,705 B2
(45) Date of Patent: Apr. 14, 2020

(54) COMPLETING AN IMAGE

(71) Applicant: DASSAULT SYSTEMES, Velizy Villacoublay (FR)

(72) Inventors: Fabrice Francis Michel, Grabels (FR); Ismael Belghiti, Les Loges en Josas (FR)

(73) Assignee: DASSAULT SYSTEMES, Velizy Villacoublay (FR)

(*) Notice: Subject to any disclaimer, the term of this patent is extended or adjusted under 35 U.S.C. 154(b) by 61 days.

(21) Appl. No.: 15/841,837

(22) Filed: Dec. 14, 2017

(65) Prior Publication Data

US 2018/0174276 A1    Jun. 21, 2018

(30) Foreign Application Priority Data

Dec. 21, 2016 (EP) .................................. 16306754

(51) Int. Cl.
| | | |
|---|---|---|
| *G06T 5/00* | (2006.01) | |
| *G06K 9/62* | (2006.01) | |
| *G06T 5/50* | (2006.01) | |

(52) U.S. Cl.
CPC ............ *G06T 5/005* (2013.01); *G06K 9/6223* (2013.01); *G06T 5/50* (2013.01); *G06T 2207/10016* (2013.01); *G06T 2207/20016* (2013.01); *G06T 2207/20072* (2013.01)

(58) Field of Classification Search
CPC . G06T 5/005; G06T 5/50; G06T 2207/20016; G06T 2207/10016; G06T 2207/20072; G06K 9/6223

See application file for complete search history.

(56) References Cited

U.S. PATENT DOCUMENTS

| | | | |
|---|---|---|---|
| 9,594,976 B2 * | 3/2017 | Zheng | ....................... G06K 9/46 |
| 2018/0150940 A1 * | 5/2018 | Reinhard | .............. G06T 11/001 |

OTHER PUBLICATIONS

Tony F. Chan, et al., "Non-Texture Inpainting by curvature-driven diffusions (CDD)", Journal of Visual Communication and Image Representation, 2001, pp. 1-16.

Stuart Geman, et al., "Stochastic Relaxation, Gibbs distributions, and the Bayesian Restoration of Images", Pattern Analysis and Machine Intelligence, 1984, pp. 721-741.

Michal Aharon, et al., "K-SVD: An Algorithm for Designing Overcomplete Dictionaries for Sparse Representation", IEEE Transactions on Signal Processing, vol. 54 No. 11, Nov. 2006, pp. 4311-4322.

(Continued)

*Primary Examiner* — Phuoc Tran
(74) *Attorney, Agent, or Firm* — Oblon, McClelland, Maier & Neustadt, L.L.P.

(57) ABSTRACT

The invention notably relates to a computer-implemented method for completing an image having at least one hole, the method comprising providing a dictionary of atoms representative of the known part of the image; determining an optimal distribution of atom linear combinations with a process comprising at least one minimization of a respective energy defined on a respective Markov Random Field having nodes and labels, each node corresponding to a respective location of the hole and being associated to a respective label; and filling the hole with the optimal distribution. The invention improves the field of image completion.

16 Claims, 4 Drawing Sheets
(3 of 4 Drawing Sheet(s) Filed in Color)

(56) References Cited

OTHER PUBLICATIONS

Pietro Perona, et al., "Scale-Space and Edge Detection Using Anisotropic Diffusion" IEEE Transactions on Pattern and Machine Intelligence, vol. 12 No. 7, Jul. 1990, pp. 629-639.
Adele Cutler, et al., "Archetypal Analysis" Technometrics, vol. 36 No. 4, Nov. 1994, pp. 338-347 with cover page.
Extended European Search Report dated Jun. 8, 2017 in European Patent Application No. 16306754.9.
Nikos Komodakis, et al,. "Image Completion Using Efficient Belief Propagation Via Priority Scheduling and Dynamic Pruning", IEEE CVPR Trans., 2007, 8 Pages.
Tijana Ruzic, et al., "Context-Aware Patch-Based Image Inpainting Using Markov Random Field Modeling", IEEE Transactions on Image Processing, vol. 24 No. 1, Jan. 2015, pp. 444-456.
Didier Auroux, et al.; "A One-shot Inpainting Algorithm Based on the Topological Asymptotic Analysis"; Computational & Applied Mathematics; vol. 25, No. 2-3; 2006; ISSN 0101-8205; 17 pages.
Nikos Komodakis, et al.; "Image Completion Using Global Optimization"; To Appear in the Proceeding of IEEE CVPR 2006; 8 pages.
Rodolphe Jenatton, et al.; "Proximal Methods for Hierarchical Sparse Coding"; Journal of Machine Learning Research 12; 2011; 38 pages.
Guillaume Lavoue, et al.; "Markov Random Fields for Improving 3D Mesh Analysis and Segmentation"; Eurographics Workshop on 3D Object Retrieval (2008); 8 pages.
Ivars Peterson; "Filling in Blanks, Automating the Restoration of a Picture's Missing Pieces"; www.sciencenews.org; May 11, 2002; vol. 161; 2 pages.
Javier Portilla, et al.; "A Parametric Texture Model Based on Joint Statistics of Complex Wavelet Coefficients"; International Journal of Computer Vision 40(1), 2000; 23 pages.
Michal Aharon, et al.; "K-SVD: An Algorithm for Designing Overcomplete Dictionaries for Sparse Representaton"; IEEE Transactions on Signal Processing; vol. 54, No. 11; Nov. 2006, 12 pages.
Didier Auroux, et al.; "A One-shot Inpainting Algorithm Based on the Topological Asymptotic Analysis"; Computational & Applied Mathematics; vol. 25, No. 2-3; 2006; ISSN 0101-3205; Dec. 2006, 17 pages.
Connelly Barnes, et al.; "PatchMatch: A Randomized Correspondence Algorithm for Structural Image Editing"; Aug. 2009, 10 pages.
M. Bertalmio, et al.; "Navier-Stokes, Fluid Dynamics, ands Image and Video Inpainting"; Jun. 2001, 8 pages.
Tony F. Chan, et al.; "Non-Texture inpainting by Curvature-Driven Diffussions (CDD)"; Dec. 2001, 16 pages.
Xiaowu Chen, et al.; "Automatic Image Completion with Structure Propagation and Texture Synthesis"; State Key Laboratory of Virtual Reality Technology and Systems School of Computer Science and Engineering; Beihang University, Beijin, P.R. China; Dec. 2010, 21 pages.
Vladimir Kolmogorov; "Convergent Tree-Reweighted Message Passing for Energy Minimization"; Microsoft Research, Cambridge, UK; Jan. 2015, 8 pages.
A. Criminisi, et al.; "Region Filling and Object Removal by Exemplar-Based Image Inpainting"; Microsoft Research, Cambridge (UK) and Redmond (US); IEEE Transactions on Image Processing; vol. 13, No. 9, Sep. 2004; 13 pages.
Adele Cutler, et al.; "Archetypal Analysis", Technometrics; vol. 36, No. 4; Nov. 1994; 11 pages.
Iddo Drori, et al.; "Fragment-Based Image Completion"; School of Computer Science; Tel Aviv University; Aug. 2003, 10 pgs.
Alexei A. Efros, et al.; "Texture Synthesis by Non-parametric Sampling"; IEEE International Conference on Computer Vision; Corfu, Greece; Sep. 1999; 6 pages.
Stuart Geman, et al.; "Stochastic Relaxation, Gibbs Distributions, and the Bayesian Restoration of Images"; IEEE Transactions on Pattern Analysis and Machine Intelligence; vol. PAM1-6, No. 6, Nov. 1984, 21 pgs.
David J. Heeger, et al.; "Pyramid-Based Texture Analysis/Synthesis"; Mar. 2000, 10 pages.
Nikos Komodakis, et al.; "MRF Optimization via Dual Decomposition: Message-Passing Revisited"; Nov. 2007, 8 pages.
Nikos Komodakis, et al.; "Image Completion Using Global Optimization"; To Appear in the Proceeding of IEEE CVPR 2006; Jun. 2006, 8 pages.
Rodolphe Jenatton, et al.; "Proximal Methods for Hierarchical Sparse Coding"; Journal of Machine Learning Research 12; Jul. 2011; 38 pages.
Kaiming He, et al.; "Computing Nearest-Neighbor Fields via Propagation-Assisted KD-Trees"; Jun. 2012, 8 pages.
Kaiming He, et al.; "Statistics of Patch Offsets for Image Completion"; Oct. 2012, 14 pages.
Nikos Komodakis, et al.; "MRF Energy Minimization and Beyond via Dual Decomposition" IEEE Transactions on Pattern Analysis and Machine Intelligence; vol. 33, No. 3; Mar. 2011; 22 pages.
Guillaume Lavoue, et al.; "Markov Random Fields for Improving 3D Mesh Analysis and Segmentation"; Eurographics Workshop on 3D Object Retrieval (2008); Jan. 2008, 8 pages.
Julien Mairal, et al.; "Sparse Modeling for image and Vision Processing"; arXiv:1411.3230V2 [cs.Cv]; Dec. 6, 2014.
Pietro Perona, et al.; "Scale-Space and Edge Detection Using Anisotropic Diffusion"; IEEE Transactions on Pattern Analysis and Machine Intelligence; vol. 12, No. 7; Jul. 1990.
Ivars Peterson; "Filling in Blanks, Automating the Restoration of a Picture's Missing Pieces"; www.sciencenew.org; May 11, 2002; vol. 161; 2 pages.
Javier Portilla, et al.; "A Parametric Texture Model Based on Joint Statistics of Complex Wavelet Coefficients"; International Journal of Computer Vision 40(1), Jun. 2000; 23 pages.
Jian Sun, et al.; "Image Completion with Structure Propagation"; Jul. 2005, 8 pages.
Li-Yi Wei et al.; "Fast Texture Synthesis Using Tree-Structured Vector Quantization"; May 2000, 10 pages.
Y. Wexler, et al.; "Space-Time Video Completion"; Dept. of Computer Science and Applied Math; The Weizman Institute of Science; Rehovot, 761000, Israel; Mar. 2007, 8 pages.
Nikos Komodakis, et al; "Image Completion Using Efficient Belief Propagation Via Priority Scheduling and Dynamic Pruning"; IEEE Transactions on Image Processing, vol. 16, No. 11; Nov. 2007.
Tijana Ruzic, et al.; "Context-Aware Patch-Based Image Inpainting Using Markov Random Field Modeling"; IEEE Transactions on Image Processing; vol. 24, No. 1; Jan. 2015; 13 pages.
Extended Search Report dated Aug. 6. 2017 in European Patent Application No. 16306754.9-1906; 10 pages.

* cited by examiner

COMPLETING AN IMAGE

CROSS-REFERENCE TO RELATED APPLICATIONS

This application claims priority under 35 U.S.C. § 119 or 365 to European Application No. 16306754.9, filed Dec. 21, 2016. The entire contents of the above application(s) are incorporated herein by reference.

FIELD OF THE INVENTION

The invention relates to the field of computer programs and systems, and more specifically to a method, system and program for completing an image having at least one hole.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context and other contexts, much research has been performed on image completion. Image completion designates algorithms for completing an image having at least one hole. Image completion includes image inpainting, which designates image completion where the at least one hole is(are) relatively small. Image completion of relatively large holes may be a more difficult problem to solve than image inpainting. Indeed, image inpainting is akin to interpolation, where one can only extrapolate the value of the surrounding pixels.

Image completion is useful in different contexts, including in all image retouching applications in which part of the image has been removed and, for example, a user needs to fill in the removed part. This includes applications in which one wants to move an object in an image, or one wants to replace an object in an image with something else. More generally image completion can be useful in any situation where one wants to fill in missing data and the data is organized as a contiguous 2D array (matrix form), or more generally as a contiguous ND array.

Three known categories of image completion can be identified:
A. PDE-based methods
B. Statistically-based methods
C. Exemplar-based methods A. PDE-Based Methods PDE-based methods were first introduced for image inpainting where the holes often come from crackles, creases, artifacts or reflects. These methods consider filling the void that is left by propagating the information from the edges of the void. The information is propagated using partial differential equations that are solved on a pixel level. Such equations include propagation equations such as the heat equation. These methods often use Laplace's PDE with Dirichlet boundary conditions or simulate an anisotropic diffusion process. While pure diffusion methods result in blurred completion, some algorithms have been designed to preserve the edges.

Examples of PDE-based methods can be found in the following papers:
Bertalmio, Marcelo, Andrea L. Bertozzi, and Guillermo Sapiro. *Navier-stokes, fluid dynamics, and image and video inpainting.* CVPR. 2001
Chan, Tony F., and Jianhong Shen. *Nontexture inpainting by curvature-driven diffusions.* Journal of Visual Communication and Image Representation. 2001
Auroux, Didier, and Mohamed Masmoudi. *A one-shot inpainting algorithm based on the topological asymptotic analysis.* Computational & Applied Mathematics. 2006
Pietro Perona and Jitendra Malik. *Scale-space and edge detection using anisotropic diffusion.* IEEE Trans. 1990
Ivars Peterson. *Filling in blanks: Automating the restoration of a picture's missing pieces.* Science News. 2002

B. Statistically-Based Methods

Statistically-based methods are mainly used for the case of texture (i.e. repetitive pattern in an image) synthesis. Most of natural pictures are formed of a patchwork of textures (e.g. in the case of a picture of a person on a grassy field, the grassy field can be seen as a texture). Textures are seemingly random, and texture synthesis aims at achieving a degree of randomness that is pleasing to the eye. These methods are composed of two steps:
1) Learning step: Given an input texture, the methods try to describe it by extracting relevant statistics through the use of compact parametric statistical models. This compact statistical model is often based on wavelet coefficients and can combine a multi-scale approach.
2) Diffusion step: The texture is grown inwards to complete the unknown region. Statistically based methods generally fail for the problem of image completion where structures in the image can be found, because structure is not random.

Examples of statistically-based methods can be found in the following papers:
Portilla, Javier, and Eero P. Simoncelli. *A parametric texture model based on joint statistics of complex wavelet coefficients.* IJCV. 2000
Heeger, David J., and James R. Bergen. *Pyramid-based texture analysis/synthesis.* SIGGRAPH. 1995
Li-Yi Wei and Marc Levoy. *Fast texture synthesis using tree-structured vector quantization.* SIGGRAPH, pages 479-488. 2000

C. Exemplar-Based Methods

In exemplar-based methods, the void left is filled using existing image patches. Roughly speaking this consists in copying parcels of the image and pasting them inside the void. The way the hole is filled with these patches differs according to the method chosen. Most of exemplar-based methods can be associated to one of the three following classes:

1) Inwards diffusion methods: The earliest methods complete the void iteratively. In paper "Criminisi, Pérez, and Toyama. *Region filling and object removal by exemplar-based image inpainting*. IEEE Transactions on Image Processing. 2004", the void is filled from the outer edge inwards with small patches, once the first outer ring is patched, the algorithm starts again as if the void was smaller, until the void is patched up. Another example can be found in paper "Xiaowu Chen, Bin Zhou, Fang Xu, and Qinping Zhao. *Automatic image completion with structure propagation and texture synthesis*. 2010". Unfortunately, these algorithms are often stuck because of bad choices on the borders that make the completion of the center impossible.

2) Matching-based methods: These methods are often related to texture models and use patch reinjection. They iteratively try to improve the current filling by replacing a patch in the unknown region with a known patch (often taken as the nearest patch in the extracted collection). In paper "Drori, Iddo, Daniel Cohen-Or, and Hezy Yeshurun. *Fragment-based image completion*. ACM Transactions on Graphics. 2003", the void is filled by starting at low scales where the void can be seen as a small hole that can be patched by only one image patch and then working the way up to full resolution from the previous image, and finding patches that match the filling that was made at the previous resolution. Similar approaches can be found in paper "Alexei A. Efros and Thomas K. Leung. *Texture synthesis by non-parametric sampling*. ICCV, pages 1033-1038. 1999" and paper "Yonatan Wexler, Eli Shechtman, and Michal Irani. *Space-time video completion*. CVPR (1), pages 120-127. 2004". These methods also suffer from an important flaw: during the iteration, if one step fails, then the result is completely off. Phantom parts of the image can thus be copied inside the void resulting in images that are not realistic.

3) Statistical Offsets Analysis methods: These methods learn the main displacements in the image, through a statistical model, and use this knowledge to fill the missing part. Examples of this kind of methods can be found in paper "Kaiming He and Jian Sun. *Computing nearest-neighbor fields via propagation-assisted kd-trees*. IEEE Conference on Computer Vision and Pattern Recognition. 2012" and paper "Kaiming He and Jian Sun. *Statistics of patch offsets for image completion*. Computer Vision—ECCV. 2012". These methods perform correctly when the image contains structural regularities (as for example in architecture images), but often fail drastically on general images.

A famous example of an exemplar-based approach is the algorithm called Patch-Match disclosed in paper "Connelly Barnes, Eli Shechtman, Adam Finkelstein, and Dan B. Goldman. *Patch-match: a randomized correspondence algorithm for structural image editing*. ACM Trans. Graph., 28(3), 2009". This algorithm has been highly popularized by its use in Adobe Photoshop™ Content Fill Aware. In practice, this heuristic is simple to implement, but it is not robust.

Within this context, there is still a need for an improved way of completing an image having at least one hole.

SUMMARY OF THE INVENTION

It is therefore provided a computer-implemented method for completing an image having at least one hole. The method comprises providing a dictionary of atoms representative of the known part of the image. The method also comprises determining an optimal distribution of atom linear combinations with a process comprising at least one minimization of a respective energy defined on a respective Markov Random Field having nodes and labels, each node corresponding to a respective location of the hole and being associated to a respective label. The method also comprises filling the hole with the optimal distribution.

The method may comprise one or more of the following:
- each label takes its value within a finite set of values, preferably comprising less than 500, 200, 150 or 100 values;
- the process comprises a matching-based algorithm initialized with the result of the at least one minimization and based on patches extracted from the known part of the image;
- the determining implements a top-down approach;
- the at least one minimization of an energy includes a first minimization, each label of the Markov Random Field respective to the first minimization taking its value within the dictionary of atoms, and then a second minimization, each label of the Markov Random Field respective to the second minimization taking its value within a predetermined set of coefficients;
- the predetermined set of coefficients stems from a K-means clustering of a set of coefficients to be applied to the atoms for producing patches of the known part of the image;
- the energy respective to the first minimization penalizes photometric distortion and/or statistical distortion, and/or the energy respective to the second minimization penalizes photometric distortion and/or statistical distortion;
- the first minimization further penalizes an extent of unrespect of borders of the hole;
- the method then further comprises a third minimization, each label of the Markov Random Field respective to the third minimization taking its value within the dictionary of atoms, and then a fourth minimization, each label of the Markov Random Field respective to the fourth minimization taking its value within the predetermined set of coefficients;
- the energy respective to the third minimization penalizes statistical distortion, and/or the energy respective to the fourth minimization penalizes statistical distortion;
- the image is a frame of a video; and/or
- the video further includes one or more other images prior to the image, the method comprising determination of the dictionary of atoms based on the one or more other images.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the invention will now be described, by way of non-limiting example, and in reference to the accompanying drawings, where.

DETAILED DESCRIPTION OF THE INVENTION

Figure 1:
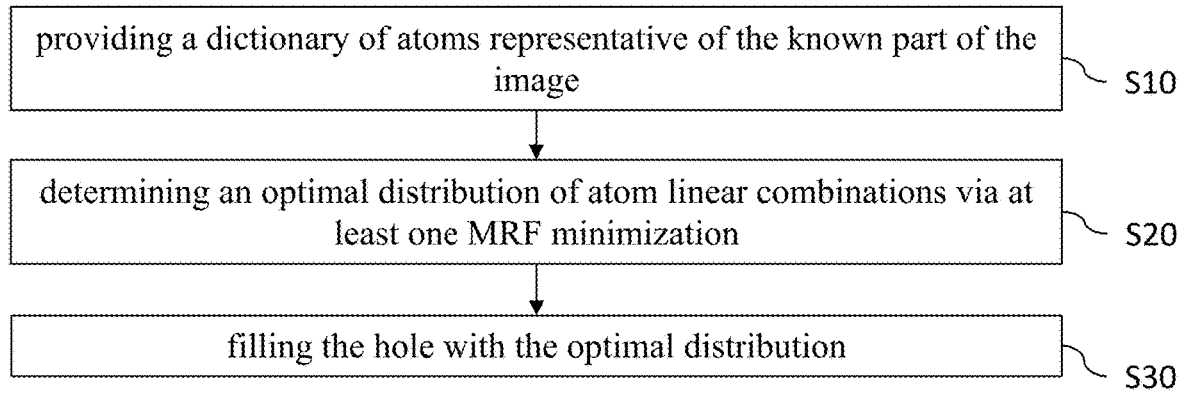
FIG. 1 shows a flowchart illustrating the method.

FIG. 1 illustrates the computer-implemented method for completing an image having at least one hole. The method comprises providing S10 a dictionary of atoms representative of the known part of the image. The method also comprises determining S20 an optimal distribution of atom linear combinations. The determining S20 is performed with a process comprising at least one minimization of a respective energy defined on a respective Markov Random Field having nodes and labels. Each node corresponds to a respective location of the hole and is associated to a respective label. The method also comprises filling S30 the hole with the optimal distribution. Such a method improves the field of image completion.

Notably, compared to prior art image completion approaches, the method allows to reach a result of relatively high quality (e.g. a highly realistic result), in a relatively high number of situations, including in situations where the hole is relatively large, in a relatively short computing time, and using relatively little memory and processing resource.

The method fills at S30 the hole of an image, and thereby allows obtaining a complete image. Thanks to the provision at S10 of, not any set of elements, but a dictionary of atoms representative of the known part of the image in specific, the filling S30 may result in a particularly realistic completion of the image. The result may notably be relatively rich (e.g. integrating information contained in the—e.g. whole-known part of the image, e.g. instead of the contour of the hole only) and/or comprise relatively few artefacts, blurs or abrupt textured shapes (e.g. localized in replacement of the hole). Also, thanks to the provision at S10 of a dictionary in specific, the basis for the determination S20 of the optimal distribution may be relatively small and/or the atom linear combinations may be relatively sparse. This allows a relatively fast convergence and/or reaching an almost true optimum and thus a most adequate result (e.g. without any pruning during the determination S20 of the optimal distribution). Moreover, the provision at S10 of such a dictionary allows the use at S20 of Markov Random Field (MRF) energy minimization(s) in specific, which is known to be robust and relatively fast to converge.

The image is any data structure consisting of a—e.g. contiguous—ND array (i.e. an array of dimension N, where N is any positive integer, for example 2), where each position of the array is called "pixel" and may be associated to a value of a (e.g. same) physical signal. The image may notably be a picture, that is, a 2D array where pixels are associated to a value representative of color (e.g. the physical signal value being an RGB value and/or a grey shade value). The image may be a natural image, that is, an image acquired by a sensor (e.g. on a real scene and/or one or more real objects), an artificial image (e.g. a synthetic image), or a combination and/or superposition of one or more natural images with one or more virtual images. The image may be a natural picture, such as a numeric photograph. Alternatively, the image may be a depth image, an infrared image, or any combination of a natural image, an artificial image, a depth image and/or an infrared image.

The image comprises one or more hole(s). A hole is a contiguous set (e.g. plurality) of positions of the array, which are not associated to any physical signal values and to which values are thus to be assigned, or which are already associated to physical signal values but to which replacement physical signal values are to be assigned (e.g. because the current values are corrupted or associated to an object to be removed). The method determines at S20 said values to be assigned. Such assignment is performed by the filling S30 of the method. As such, the filling S30 operates image completion with respect to the hole.

Said image completion may be implemented in an image retouching application, e.g. in which part of the image has been removed and, for example, a user needs to fill in the removed part. Said image completion may be implemented in an application in which one wants to move an object in the image, or one wants to replace an object in the image with something else. Said image completion may also be implemented for completing a video (i.e. time sequence of picture frames) that includes the image (e.g. as a picture frame of the video).

In the case of video completion, the video may include one or more other images prior to the completed image (in other words, one or more picture frames that come in the time sequence before the picture frame completed by the filling S30). In such a case, the method may comprise determination of the dictionary of atoms based (e.g. exclusively) on said one or more prior images. The video may stem from a time-continuous caption. In such a case, the dictionary of atoms may be representative of ulterior images and can thus be efficiently used for completion of such ulterior images. This allows determining the dictionary in advance, and thereby performing ulterior completion(s) fast, for example real-time as the video is played (i.e. with no buffering at all). In examples, the dictionary may be determined once and for all the video, based on one or more initial picture frames. Alternatively, the dictionary may be continuously updated. This allows taking into account modifications of the environment as time goes. In all cases, the method of FIG. 1 may be repeated for different frames.

An atom is a patch that is an element of a dictionary. A patch is a data structure of the same nature as the image but of a smaller size. A patch may thus be called "image patch". An image patch may be defined as a small rectangle (e.g. a square) of pixels for a 2D image. A patch may be smaller than 20, 16, 15 or 10 pixels in each dimension, or smaller than said value in one dimension and/or smaller than 20, 16, 15 or 10 pixels in one or more dimensions. A patch may be larger than 4 or 6 pixels in one dimension and/or 4 or 6 pixels in another dimension. An image patch may for example—e.g. always—be of size 8×8 pixels.

An atom linear combination is a patch that results from a linear combination (in the algebraic meaning) of one or more atoms, e.g. having same dimensions, i.e. wherein for each pixel coordinates the value(s) of the physical signal of the one or more atoms for said pixel coordinates are linearly combined (according to the linear combination). An atom linear combination may thus have the same size as the atoms involved in the linear combination. The dictionary of atoms provided at S10 may consist of atoms of a same and predetermined size (i.e. fixed size, smaller than the image's size as explained above). The linear combinations may involve a fixed or a variable number of atoms, e.g. depending on the parameters of the determination S20, notably the way the at least one minimization is performed. Linear combinations may (e.g. all) involve only one atom. In such a case the linear combinations may amount to multiplication of an atom with a positive or negative (non-zero) scalar. Alternatively at least one linear combination (e.g. all the linear combinations) may involve strictly more than one atom (for example, exactly two atoms). The linear combinations may all involved a same and common number of atoms. In any case, an atom linear combination forms a patch and can thus be assigned to a location of the image so as to locally modify the image (i.e. create or replace a physical signal value).

A distribution of atom linear combinations is a set (e.g. plurality) of atom linear combinations, where each atom linear combination is spatially positioned relatively to the other atom linear combinations. A distribution of atom linear combinations thus forms a spatial distribution of patches and can therefore be assigned to locations of the image so as to modify the image. These locations may correspond to MRF nodes. The spatial distribution may notably correspond to the geometry of the hole, for example cover the hole (e.g. at least substantially). Filling the hole with a distribution may thus comprise positioning/superposing the distribution over the hole and assigning physical signal values (e.g. color) to pixels of the distribution to corresponding pixels of the hole.

In case pixels of patches of the distribution overlap together (i.e. the pixels are superposed at the time of the fitting S30), the value of the physical signal retained for the resulting pixel may correspond to an addition or an average of the values of the physical signal for the pixel respective to each of the overlapping pixels. Patches of the distribution may notably each have a band of pixels (e.g. of width 4, e.g. in the case of patches of size 8×8 pixels) overlapping with a band of same size of each respective adjacent patch. In case pixels of patches of the distribution overlap with pixels of the image out of the hole, the value of the physical signal retained for the resulting pixel may correspond to an addition or an average of the values of the physical signal for the pixel respective to each of the overlapping pixels or replacement of the pixel of the image with the pixel of the patch of the distribution. Such overlapping may in any case be handled according to predetermined rules. Said predetermined rules may be taken into account in the formulation of each MRF energy.

At least one of the one or more hole(s) may be large. A large hole can be defined as a hole which cannot be fully covered by a single patch or atom or atom linear combination. The hole may for example correspond to a foreground object to be removed from the image. Indeed, examples of image completion include the removal of a large foreground object in a picture and filling the void left. By opposition, one can define image inpainting as the completion of a small structure on an image. In image inpainting the structures can typically be filled with a single overlapping patch. Examples of image inpainting include the removal of text on a picture and filling the void left. The method of FIG. 1 can be applied in both cases. Notably, the method of FIG. 1 can be applied efficiently (i.e. providing a good result in a fast manner) even in the case the hole is large. The hole may for example be larger than 10% of the hole size of the image, for example of the order ¼ of the hole size of the image.

The dictionary of atoms provided at S10 is now discussed.

A dictionary is a set of elements called "atoms", the dictionary being representative of a given dataset. The given dataset is the known part of the image in the case of the method of FIG. 1, which is the part of the image outside the hole. By "representative of the known part of the image", it is meant that for (e.g. substantially) each given patch of the known part which has the same size of at least one atom of the dictionary, there is a linear combination of atoms having said size which results in a patch at least similar to the given patch. The atoms of the dictionary provided at S10 may all have a same given size. In such a case, by "representative of the known part of the image", it is meant that for (e.g. substantially) each given patch of the known part which has said same given size, there is a linear combination of atoms which results in a patch at least similar to the given patch. Two patches of a same size are said to be "at least similar" if the two patches are at least close to each other with respect to a predetermined patch distance, which may be any distance between two images, for example the photometric distortion. By "close to each other", it is meant that the distance between the two images is below a predetermined (e.g. and relatively low) threshold. The threshold may be an increasing function of the number of pixels in the two patches.

Now, the dictionary is not any such set, but one that specifically ensures that for (e.g. substantially) each given patch of the known part which has the same size of at least one patch of the dictionary, there is a sparse linear combination of atoms having said size which results in a patch at least similar to the given patch. By "sparse linear combination of atoms", it is meant that the number of atoms involved in the linear combination is small, for example always inferior to 15, always inferior to 10, or always inferior to 5. Also, the dictionary may be a set of relatively small size.

The dictionary may in examples comprise a set of patches extracted as such from the known part of the image (for example more than 5%—e.g. of the order 10%—of the number of patches in the known part of the image). The dictionary may for example comprise or consist of:
  patches extracted at regular locations in the known part of the image;
  patches extracted at locations of interest in the known part of the image (e.g. using one or more detectors of such locations of interest, for example including Harris Dector);
  patches extracted from a statistical model operated on the known part of the image (e.g. in cases where the image includes only few different textures); and/or
  a dense set of patches extracted from the known part of the image.

Alternatively or additionally, the dictionary may be a set comprising patches obtained by dictionary-learning. The dictionary of atoms may thus comprise or consist of a dictionary-learnt set of patches.

The concept of dictionary-learning is known at least since paper "Elad M, Aharon M. *K-svd: An algorithm for designing overcomplete dictionaries for sparse representation.* IEEE Transactions on Signal Processing. 2006". Dictionary-learning is formally an extension of the wavelet theory applied to image patches. In the wavelet theory, an image patch can be decomposed on a vector basis formed of wavelets. An image patch can thus be represented as a linear combination of wavelets. An image patch wavelet base is composed of as much basis vectors as there are pixels in the image patch. Decomposing an image patch on such a basis is interesting because most wavelet coefficients are zero or close to zero, allowing for good compression rates. Having most of the coefficients to zero or close to zero is the definition of a sparse decomposition.

Dictionary-learning takes this theory on step further, for example by decomposing an image patch on an overcomplete family (i.e. a set where there are—e.g. much—more vectors than pixels in the image patch) which is called "dictionary". A set of k vectors, in a space of dimension n, is said to be overcomplete when the k vectors generate the whole space and k>n. In other words, the set strictly includes a vector basis. In examples, k may be much larger than n, for example k≥n. This decomposition is by design sparse, because enforced in the dictionary creation process.

A purpose of dictionary-learning is to find a dictionary such that for all image patches y one can find a sparse representation x. The tradeoff between the sparsity of x and the accuracy of the decomposition can be expressed in different ways. In the literature, one can often find the following minimization problems (any of which can be implemented by the method of FIG. 1):

1. Minimize $\|y-D_x\|^2$ with $\|x\|_0 \leq T$
2. Minimize $\|x\|_0$ with $\|y-D_x\|^2 \leq M$
3. Minimize $\|y-D_x\|^2 + \lambda \|x\|_1$ (with $\lambda > 0$)

where T, M, λ are parameters controlling the sparsity.

Algorithms for solving the above problems are known as such, and a survey can be found in paper "Mairal, Julien, Francis Bach, and Jean Ponce. *Sparse modeling for image and vision processing*. 2014" (being noted that any algorithm in the survey may be implemented by the method of FIG. 1).

In this representation, x is a sparse vector the non-zero coefficients of which correspond to the columns in the dictionary (i.e. the atoms) that are interesting to explain signal y. The value of those coefficients quantifies the mix between atoms. Remark that the method may also enforce some structure in the choice of selected atoms (those who get non-zero coefficients), as in paper "Rodolphe Jenatton, Julien Mairal, Guillaume Obozinski, and Francis Bach. *Proximal methods for hierarchical sparse coding*. Journal of Machine Learning Research. 2011".

Learning a dictionary effectively is learning a set of atoms that best represent patches of an image or a set of images, that when combined together linearly allow the reconstruction of the image. The method of FIG. 1 may use this fact to be able to invent relevant missing parts of an image without ever copying content from the image (which approach would lead to unwanted artefacts and thus implausible results).

The dictionary provided at S10 may comprise or consist of a dictionary-learnt according to the above, for example learnt on the fly when performing the method of FIG. 1—e.g. at least in part—and/or pre-learnt—e.g. at least in part. In the case of a learning on the fly, the providing S10 may comprise learning the dictionary. The database on which the dictionary-learning may be performed can be any appropriate database of patches appropriate for leading to a dictionary. The database may comprise or consist of a set of patches extracted as such from the known part of the image (such as any example of such an extracted set of patches provided earlier) and/or a set of patches similar to the known part of the image.

In examples, the dictionary may, based on such a database, comprise or consist of:
  a set of patches resulting from a K-means clustering;
  a set of patches resulting from a hierarchical K-means clustering;
  a set of patches resulting from a K-SVD algorithm;
  a set of patches resulting from an Archetypal Analysis (e.g. such as disclosed by paper "A. Cutler and L. Breiman. *Archetypal analysis*. Technometrics, 36(4): 338-347, 1994"); and/or
  a set of patches resulting from a Fourier decomposition.

The learning may thus amount to such known dictionary-learning processes.

The set of patches similar to the known part of the image may be extracted from a database of images of the same nature as the known part of the image. For example, if the image is an architectural (resp. interior or beach) image, then the database of images is a database of architectural (resp. interior or a beach) images. In an example, the method may be based on a very large database of labeled images (such as ImageNet). In such a case, the method may comprise the labeling or classification of the input image, and then a dictionary-learning on patches stemming from images of the database having the same label or class in the database. Different existing methods are known for the labelling or classification and may be implemented by the method of FIG. 1, such as deep learning methods.

The determining S20 is now discussed.

The determining S20 is based on the dictionary provided at S10 and comprises at least one minimization of a respective MRF energy. As widely known, an MRF energy is defined on a graph of nodes, where nodes can take different values called "labels". Minimization of the energy (i.e. any optimization algorithm that amounts to such minimization, which includes maximization of the likelihood that corresponds to the energy) provides an optimum with respect to one or more criteria involved in the MRF energy. It is said that the MRF energy penalizes such one or more criteria (e.g. via penalization terms or "costs" each corresponding to a respective criterion).

In the case of the method of FIG. 1, the graph(s) are so constructed that each node corresponds to a respective location of the hole and is associated to a respective label. In case more than one minimization of a respective MRH energy is performed, the graphs for the energies may have the same structures (i.e. same nodes, i.e. same locations of the hole). The graphs underlying the MRF energies may for example form a (e.g. regular) grid covering the hole. The grid may be such that the linear combinations spatially overlap (e.g. as explainer earlier). This allows a production of strong edges in the image, and thus a high quality result.

The widely known notion of graph labeling is now discussed for the sake of clarity.

A graph is a mathematical object composed of nodes and edges. The graph labeling problem is the problem of assigning a label to each and every node of the graph. Each node can chose among a predetermined set of labels and may perform such choice according to a set of rules. The edges of the graph may also influence on the choice of the node's labels by imposing rules on node pairs, or even cliques (set of fully connected nodes).

Markov Random Fields are now discussed.

Markov Random Fields (MRF) are statistical models in which a set of random variables can take value in a predefined label set. These models aim to simultaneously encode joint probabilities between different subsets of variables. The method of FIG. 1 may in particular consider an MRF of order 2 that can be described as follows:

with respect to an underlying undirected graph (V, E), $V=(v_1, \ldots, v_n)$ being the set of vertices of the graph, each node $v_i$ corresponding to the variable $V_i$, and E the set of bidirectional edges of the graph.
  each variable $\phi_i$ can only take value in a finite set of labels $\{1, \ldots, L_i\}$
  the joint probability $p(V_1=l_1, \ldots, V_n=l_n)$ can be written as:

$$\prod_i \Phi_i(l_i) \times \prod_{\{i,j:\{v_i,v_j\} \in E\}} \psi_{\{i,j\}}(l_i, l_j)$$

where the functions ϕ, correspond to unary terms and functions $\psi_{(i,j)}$ correspond to binary terms.

In the literature and in practice, MRF solving often works with the opposite of the log-likelihood. Using a −log transform, such methods derive for each labeling a cost (also called energy):

$$E(I_1, \ldots, I_n) = \sum_i U_i(l_i) + \sum_{i,j:\{v_i,v_j\} \in E} B_{i,j}(l_i, l_j)$$

The $U_i$ functions correspond to unary term whereas the $B_{i,j}$ correspond to binary terms.

The labeling problem is now discussed.

Given such an MRF, the method may amount to considering the problem of finding an assignment ($V_1 = I_1, \ldots, V_n = I_n$) such that the energy $E(I_1, \ldots, I_n)$ is minimized (minimizing this energy will maximize the likelihood of the above formulation).

It is important to notice that this minimization is known to be NP-hard. However MRF have been largely studied since the 1980s and several heuristic algorithms provide very good results, as for example Tree ReWeighted Message Passing described in paper "Kolmogorov, V. *Convergent tree-reweighted message passing for energy minimization.* Pattern Analysis and Machine Intelligence, IEEE 2006", which may be implemented by the method.

Furthermore, the minimization(s) may be performed such that each label takes its values within a finite set of values. In such a case, discrete Markov Random Field (MRF) optimizer are known from the prior art to converge and any such algorithm may be implemented by the method for any MRF energy minimization.

For example, any MRF solving scheme described in the following references may be implemented:

J. Kappes et al, *A Comparative Study of Modern Inference Techniques for Discrete Minimization Problems*, in CVPR 2013.

Convex Relaxation MRF solving schemes (e.g. Linear Programming (Schlesinger 1976), Semidefinite Programming (Lasserre 2000), or Second-Order Cone Programming (Muramatsu and Suzuki, 2003)).

Dual of the Linear Programming Relaxation MRF solving schemes (e.g. Tree Reweighted Message Passing, Dual Decomposition).

Graph Cut MRF solving schemes (e.g. Alpha Expansion, Alpha-Beta Swap, FastPD).

Belief Propagation MRF solving schemes (e.g. Loopy Belief Propagation, Generalized Belief Propagation).

In particular, the MRF energy minimization may be configured such that each label takes its value within a finite set of values which comprises less than 500, 200, 150 or even 100 values. In such a cases, the minimization(s) is(are) particularly fast.

The method of FIG. 1 comprises at least one minimization of a respective energy. The at least one minimization may consist of exactly one minimization (i.e. only one MRF is defined, the labels corresponding to all potential linear combinations of atoms of the dictionary that can be involved in the optimal distribution).

Alternatively, the method of FIG. 1 may implement a top-down approach. By "implements a top-down approach", it is meant that the method comprises distinct MRF minimizations (each corresponding to a respective MRF energy), for example several sequential MRF energy minimizations, and the results (i.e. optimums) of all the minimizations are to be combined so as to provide the optimal distribution of atom linear combinations. In other words, each minimization provides a respective (e.g. predefined) part of the final result (i.e. the optimal distribution of atom linear combinations).

For example, a minimization searches for optimal atoms while another minimization searches for optimal coefficients. Additionally or alternatively, a minimization searches for first members (atom and/or coefficient) in the optimal linear combination to be determined while a another minimization searches for second members (atom and/or coefficient).

In such a case, the dictionary may be organized in expectation of the structure of the MRF scheme of minimizations, for example hierarchized. Atoms of the dictionary may be prepared or assigned to their respective minimizations. This allows performing the MRF minimizations faster, as the set of variables to be explored is reduced (because focused).

Such a top-down approach allows breaking an initially complex problem to a series of smaller problems, where each minimization is relatively easy, so that the determining S20 is globally fast. Yet, the breaking of the problem has relatively low impact on the quality of the finally outputted optimum.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a methods is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

Figure 2:
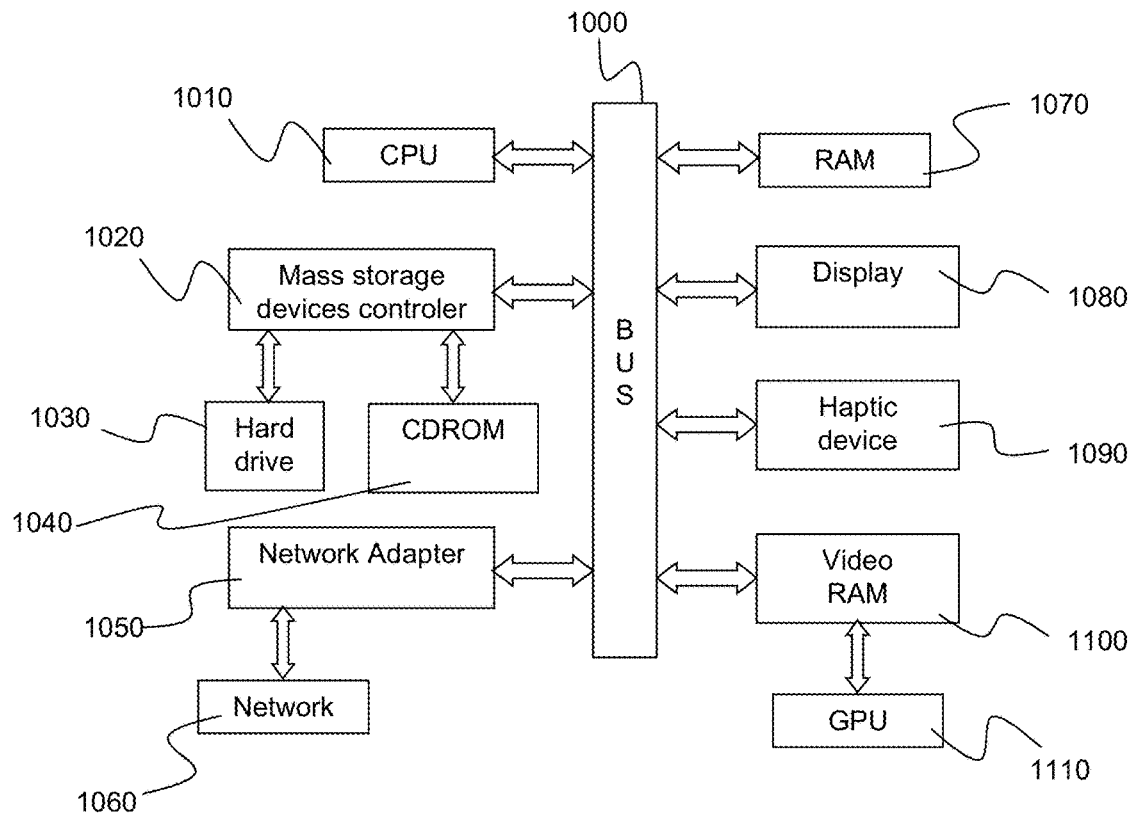
FIG. 2 shows an example of the system.

FIG. 2 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Figure 3:
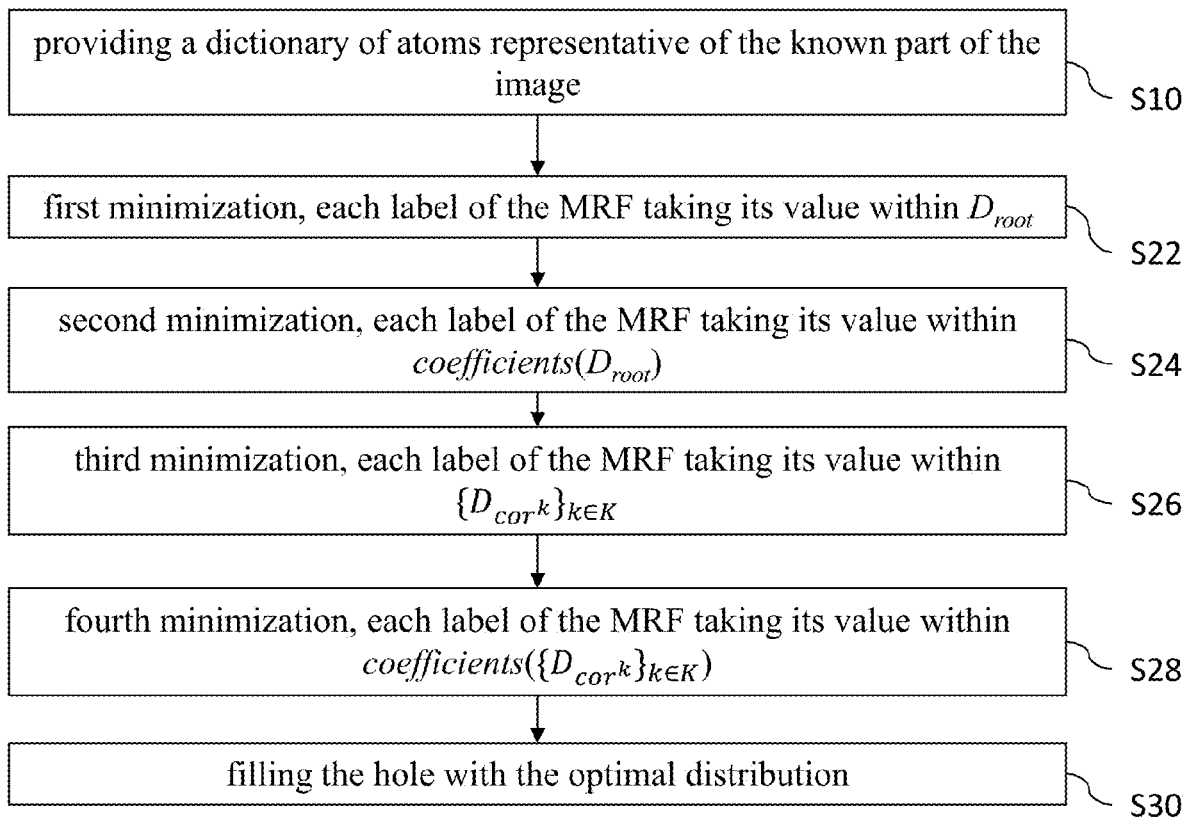
FIG. 3 shows a flowchart of an example of the method.

FIG. 3 shows an example of the method implementing a top-down approach, where the determining S20 comprises exactly four distinct minimizations each of a respective energy defined on a respective Markov Random Field. This example proves particularly efficient while leading to a high quality of the completion.

The dictionary provided (e.g. learnt) at S10 comprises a layer of root atoms and a layer of correction/corrective atoms. For each location of the hole, a first minimization finds the optimal root atom, a second minimization finds the optimal coefficient of the root atom, a third minimization finds an optimal correction atom and a fourth minimization finds the optimal coefficient of the correction atom. For the third minimization, the labels may take their values in a set of atoms of the dictionary that depends on the root atom retained. In other words, the dictionary may be hierarchical, including root atoms, and for each root atom, correction atoms. Such a set of correction atoms provided for a root atom may thus be relatively small for each root atom. This makes the method particularly efficient.

For the second and fourth minimizations, the predetermined set of coefficients in which the labels take their values may each or both stem from a regular sampling of a domain where the coefficients are defined—e.g. by the dictionary-learning—to take their values for producing patches of the known part of the image (e.g. a regular sampling of [0,1]). Alternatively, the predetermined set of coefficients may each or both stem from the set of coefficients to be applied to the atoms of the dictionary for producing patches of the known part of the image. In other words, the coefficients actually used for producing patches of the known part with linear combinations of dictionary atoms are based upon to refine the predetermined set of coefficients and thereby make the MRF minimizations faster. In examples, the set of actual coefficients is quantized using a K-means clustering. K=20 is experimentally an efficient value, as it corresponds to a set that can be explored efficiently by existing MRF optimizers and yet allow enough variation.

The dictionary may comprise less than 100 root atoms, for example a number between 25 and 75 such as about 50 root atoms. Each root atom may have less than correction atoms associated to it, for example between 5 and 10 corrective atoms. The dictionary may thus hierarchize atoms between root and corrective. The hierarchy may be implemented as a tree data structure.

Tests of the method of FIG. 3 are now discussed.

We tested the approach using the K-SVD algorithm described in paper "Elad M, Aharon M. *K-svd: An algorithm for designing overcomplete dictionaries for sparse representation*. 2006" or paper "Rodolphe Jenatton, Julien Mairal, Guillaume Obozinski, and Francis Bach. *Proximal methods for hierarchical sparse coding. Journal of Machine Learning Research,* 2011" with a "set of training signals" (i.e. input database) consisting of a set of patches of size 8×8 pixels (tests with other sizes have also been performed with similarly good results, size 8×8 being particularly efficient) extracted from the known part of the image. However, we would have reached similarly acceptable results with any other input basis (such as those described above) and/or any other dictionary-learning algorithm (such as any one of the survey of dictionary-learning algorithms provided in paper "Mairal Julien, Francis Bach, and Jean Ponce. Sparse modeling for image and vision processing. 2014".

The method of the tests leverages the accuracy of image inpainting methods in an image completion paradigm where the hole is large. To do so the method of the tests uses two powerful tools which are Markov Random Fields and Dictionary-learning.

The method of the tests makes possible the use of dictionary-learning techniques to fill large voids in images by:
  Globally solving the dictionary atom selection using a graph based approach which allows to know, for each node in the graph defined above the void, the list of atoms among which a linear combination will be made. The choice of atoms is made in a way that will preserve structure and texture from the known parts to the unknown parts of the image.
  Globally solving the coefficient selection: given the list of atoms, calibrating for each node in the graph the coefficients of the linear combination for a smooth transition between nodes in the graph.

The method of the tests allows filling the void inside the image without copying from it and thus being more realistic.

The tests were performed on one simple implementation of the method of FIG. 3 which is now described. This implementation has given particularly good results. In this implementation, the method uses a two-layered hierarchical model, where it is assumed that each patch can be obtained as the combination of a root atom and a correcting atom with proper coefficients (a Hierarchical Dictionary-learning approach is thus considered).

1) First Step: Learning the (Two-Layered) Dictionary (S10)

We first extracted a large collection of patches from the known part of the image. Then we learnt for S10, using K-SVD algorithm, a dictionary $D_{root}$ for these patches where decomposition has to be of size one (for all the images considered $D_{root}$ uses from 50 to 150 atoms). Using a similar approach, we computed for each atom $d_k$ of $D_{root}$, a dictionary $D_{cor,k}$ (using around 5 atoms) based on the residual patches left from the decompositions using the atom $d_k$. The hierarchical dictionary provided at S10 is thus determined as $D_{root}$ and all associated $D_{cor\ k}$.

2) Second Step: Building the Grid Graph (Start of S20)

The graph built is upon the missing region such that the nodes are regularly spaced defining a grid. The space between two adjacent nodes can for example be taken as the half of the patch size (e.g. if the patches are of size 8×8, the space between two adjacent nodes will be of 4 pixels). Each node is then connected to its neighbors using for example the 4-connectivity.

3) Third Step: Computing the Decompositions. (End of S20)

In this step, we want to assign to each node of our grid graph four parameters: an atom $d_k$ of $D_{root}$, a coefficient for this root atom, a correcting atom in $D_{cor,k}$, a coefficient for this correcting atom. The goal is to globally optimize these assignments in order to obtain a completion as good as possible.

This process is split in different stages:
a. During a first step, we try to optimize only on the root atoms using a multi-scale approach.
b. The second step consists in the retrieval of the coefficients for these root atoms.
c. The third step aims to find correcting atoms at each position.
d. At last, the fourth step computes coefficients for these correcting atoms.

These four optimizations use the same MRF graph (the one constructed at the second step) but differ from each other in the nature of the labels and in the cost functions used.

The following details each of these optimization stages.

a) Root Atoms Selection:

This first step aims to find a labeling of the nodes with root atoms. Roughly speaking, this step somehow consists in finding a "coarse" solution. We compute first a solution for a large step size (by step we mean the distance between two adjacent nodes), and we then refine iteratively to smaller a smaller step size. This multiscale approach is mainly performed in order to decrease the computational time. Our experiences have shown that the computation times were typically divided by five, compared to the optimization of an MRF optimization that directly deals with the smaller step, without losing too much quality in the results.

The energies are now discussed.

In the tests, the energy respective to the first minimization penalizes photometric distortion and statistical distortion, and the energy respective to the second minimization also penalizes photometric distortion and statistical distortion ("binary terms or costs" in the following).

It is possible to design the unary and binary costs of the MRF using different criteria, and also mixing them through linear combination. Here we present some cost functions that were used in the tests (any combination of these costs can be implemented):

Border respect (unary cost): We can design a unary cost function that encourages the labels on the border of the hole to coincide with the known part. Since an atom has no coefficient, we build the cost using the best possible coefficient to match the border (being somehow optimistic).

Photometric respect (binary cost): Even if we deal with atoms that do not have coefficient, we can establish a comparison measure with respect to a given offset that leads to a certain overlap zone of two atoms. We have used the opposite of cosine similarity of the atoms on their overlap region as a binary cost to obtain a photometric energy.

Statistical offsets respect (binary cost): Moreover, we have seen that the repartition of occurrences of the atoms in the image have some spatial properties. To incorporate this knowledge in the energy function, we compute for each couple of atoms label $I_1, I_2$ and each offset d (here we use either the one corresponding to the 4-connectivity or 8-connectivity) the symmetrized cost proportional to: $-\log(p_1 \times p_2)$, where $p_1$ is computed as the relative frequency in the known part of the image of finding root atom $I_2$ at a displacement d from a root atom $I_1$, and $p_2$ is defined symmetrically. More precisely, denoting $Occ(I_1)$ and $Occ(I_2)$ the occurrences in the known part of the image of these root atoms, and $Occ_d(I_1, I_2)$ the occurrence of couples $(I_1, I_2)$ seen in the known region under the offset d, we have $p_1 = Occ_d(I_1, I_2)/Occ(I_1)$ and $p_2 = Occ_d(I_1, I_2)/Occ(I_2)$.

Photometric distortion is the extent to which neighbor patches differ (e.g. modulo a luminosity normalizing coefficient). Statistical distortion is the extent to which sequences of patches reproduce the structure of the known part.

Photometric distortion can be penalized via the cosine similarity. For that the atoms may be normalized. Normalization consists in imposing a norm 1 to atoms (i.e. the sum of squares of the values of their pixels equals 1). Let us suppose that patches are of dimensions n×n. Patches overlap vertically or horizontally. In the horizontal case, the left patch has its last x columns common to the first x columns of the right patch. The intersection is thus a sort of patch itself, of height n, but of width only x (e.g. x between n/4 and n/2). The photometric distortion applies to this overlapping only.

The formulas used for the statistical distortion model canonically sequences in a probabilistic way, taking into account homogeneity and symmetry constraints.

These distortions allow modeling the propensity to have a given patch right/left/up/bottom to another given patch. The photometric distortion models the fact that two patches are "good" neighbors, independently from the context. The statistical distortion is based upon statistic of the known part (much structure is experimentally outputted from such part, even in the case of complex images). In practice, if statistical distortion is weak, then it means the pattern has appeared several times in the known part. The inverse is not true. However, in the case where one has to fill a part of the whole in a way not observed in the rest of the image, then the photometric distortion mostly performs such filling. In a way, statistical distortion is finer but it does not respond all the time, whereas photometric distortion is more robust but in some cases less fine. The combination of the two is particularly powerful because advantages of both worlds are achieved.

In the tests, the first minimization further penalizes an extent of unrespect of borders of the hole ("unary term or cost" in the following).

We have also implemented a unary cost function that aims to extends linear structures into the hole. In order to build this function, we compute the partition into connected components (for the 8-connectivity) of pixels that use the same root atoms (this computation is performed with a Depth-First Search algorithm). Then for each component adjacent to the hole, we compute its center point c and its two principal vectors $e_1$ and $e_2$ using an SVD on the covariance matrix of the points ($e1$ being associated to the largest eigenvalue $\lambda_1$, and $e_2$ to the smallest one $\lambda_2$).

If the ratio $\lambda_1/\lambda_2$ is greater than 20 and if the component contains at least 15 pixels, we do the following: for each pixel position x in the hole, we give a "bonus score" proportional to:

$$\exp\left(-\frac{\delta_1}{\lambda}\right) \times \sigma(\delta_2)$$

with $$\delta_1 = \frac{|\langle x-c, e_1 \rangle|}{\sqrt{\lambda_1}} \text{ and } \delta_2 = \frac{|\langle x-c, e_2 \rangle|}{\sqrt{\lambda_2}}$$

where σ is a sigmoid function that we have tuned to have a reasonable extinction rate:

$$\sigma(t) = \frac{1}{1 + \exp(4.6 \times (x-2.0))}.$$

This unary term has drastically improved the result of our algorithm on interior and architectural images.

b) Root Atom Coefficients Optimization:

Since coefficients are continuous, we have chosen to quantify them in order to have about twenty possible coefficients per atom, each of these values corresponding to a label in a new MRF wherein an labeling correspond to a joint choice on the coefficients of the root atoms. Experimentally, we have observed that the set of coefficients used for a given atom is not uniformly distributed but instead form clusters. We have thus considered to use a K-means clustering in order to choose the quantization step. As for the first combinatorial steps, we have designed an energy that both incorporates a photometric part and a statistical model.

The photometric part is computed using the $L_2$ norm of the different of neighboring patches (on their overlapping part), since the combined knowledge of an atom and a coefficient correspond to a patch.

For the statistical part, we learn (on the known region) for each offset d and couple of root atom labels $(I_1, I_2)$ a Gaussian model on the difference of the coefficients of $I_1$ and $I_2$ (this model has been found by displaying these differences for numerous couple of root atoms and noting that it globally follows a Gaussian distribution for the images of our dataset). The cost is then proportional to: $-\log(p_{\{l_1,l_2\}}(c_1,c_2))=-\log(g_{\{l_1,l_2\}}(c_2-c_1))$ where $g_{\{l_1,l_2\}}$ is the learnt Gaussian function and $c_1,c_2$ the coefficient parameters.

c) Correction Atoms Selection:

This third step consists in finding for each node the correcting atom that will be used. Since we already have chosen the root atoms, we only have to choose among a small number of possibility per node (typically, in this third optimization, each node can take around five different labels).

The design of the energy is very similar to the one of the root labels optimization, except that we did not use any photometric cost. We thus only used a statistical model using the offsets and unary costs for the border and edge extension.

d) Correction Atom Coefficients Optimization:

This final step optimization step is the easiest one since we only use a photometric cost to find the coefficients (since for each node we already know the root atom and its coefficient and also the choice of the correcting atoms). This computation is also very fast since we do not have to learn any model.

Remark that in our final implementation, the two coefficients retrieval steps are in fact quadratic, but since we wanted to have the possibility to try non-quadratic energies, we have used MRF optimization instead of a quadratic optimizer.

4) Fourth Step: Finishing

In order to have a better finishing for our result, we have implemented a matching-based algorithm. This algorithm is iterative and assumes that we have a good initialization (in our case, the initialization is the result given by the four previous MRF optimizations). At each iteration, we choose some set S of patches in the reconstructed region and we replace them by the nearest patch in the collection of patches extracted from the known region. Since set S can contain numerous patches that overlap each other, we have to process some average to get the final value of a pixel that lays in different patches.

Results of the tests are now presented with reference to FIGS. 4-8.

Figure 4:
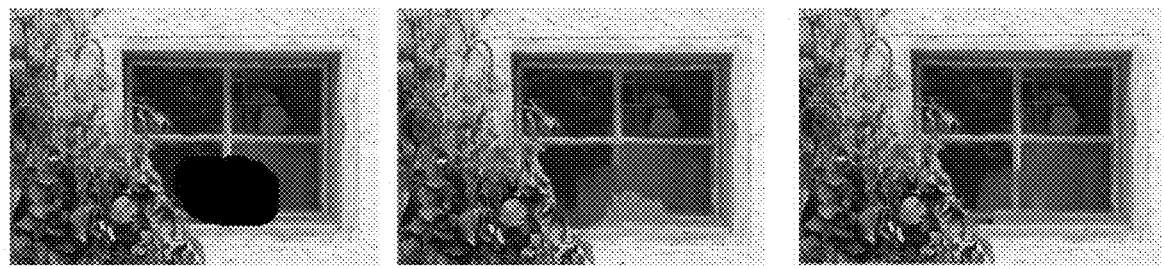
FIGS. 4, 5, 6, 7 and 8 illustrate tests performed with the method.

FIG. 4 shows, from the left to the right, an input image with a hole, the result without the edge extension unary cost, and the result with the edge extension unary cost. One can see that the result is of relatively high quality, even without the edge extension unary cost.

Figure 5:
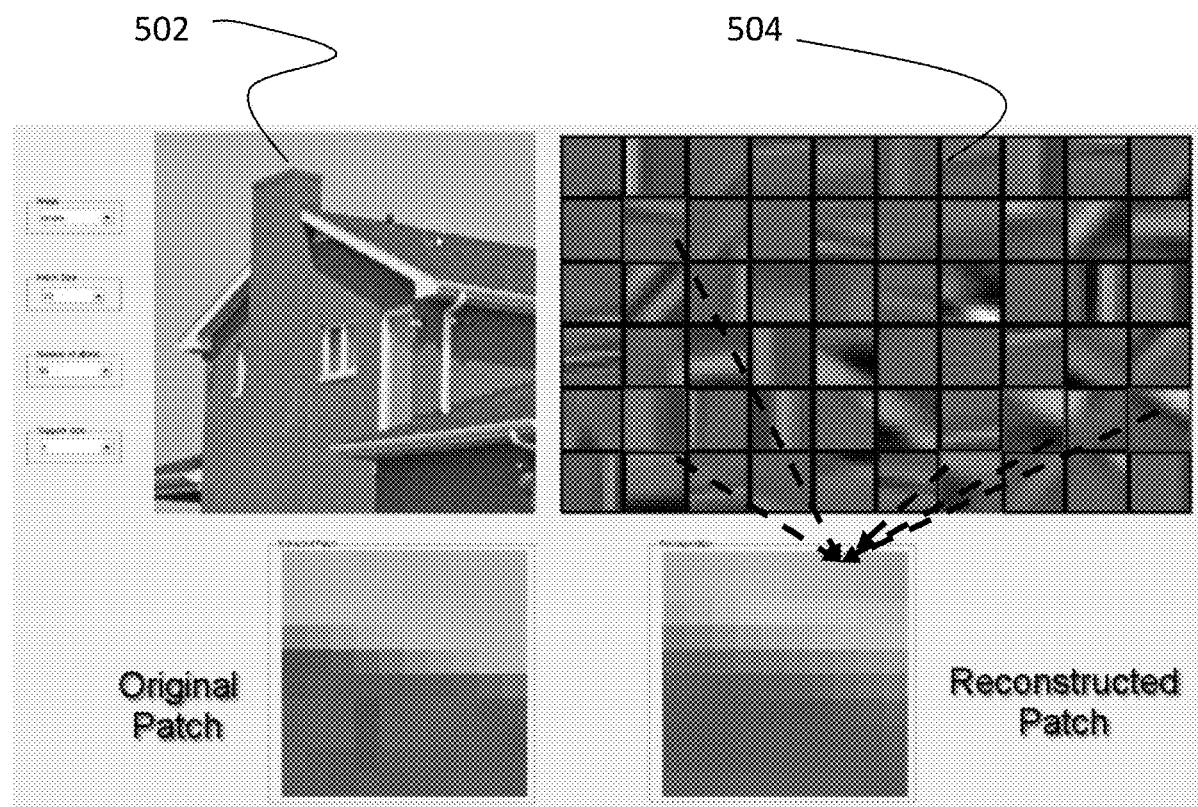

FIG. 5 shows a screenshot of the GUI interface used for the tests, where one can choose different images, patch sizes, numbers of atoms, sizes of decompositions, and visualize interactively the decomposition of any patch of a given image 502. One can see that that using a relatively small dictionary-learnt set of patches 504 based on input image 502, any original patch in the input image can be reconstructed relatively well with a linear combination of patches of the dictionary (five in the example).

Figure 6:
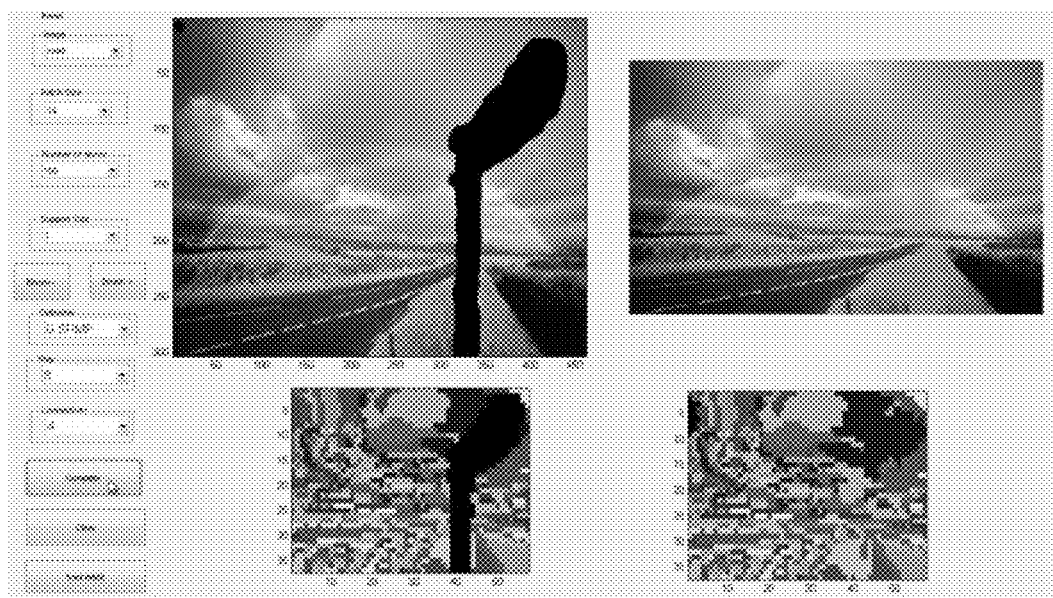

FIG. 6 shows another test of the algorithm for completing a large hole. The algorithm resulted in a high quality completion in 1.6 seconds.

Figure 7:
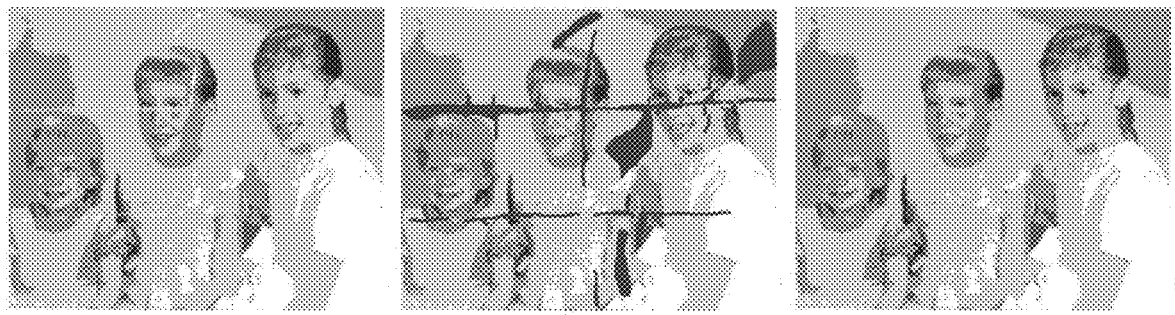

FIG. 7 shows from the left to the right, an initial deteriorated image, the selection of the region to fill, and the resulting image.

Figure 8:
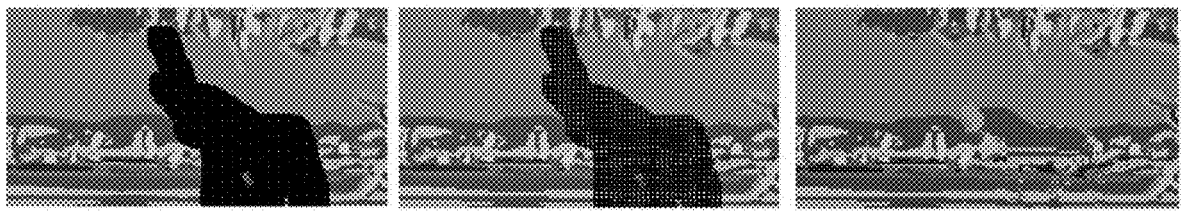

FIG. 8 shows illustrates a first layer computation with the multiscale approach. From the left to the right, one can see that the step is divided by two at each iteration. Each color corresponds to the use of a given atom label.

The tests thus showed that using an MRF approach together with dictionary-learning allowed to obtain:

A plausible result: the result images seemed natural for a human, even if small details could seem inconsistent.

A robust algorithm: the algorithm did not get stuck in bad decisions and it worked on different kinds of images (natural images, interior images, depth map images but also artificial images).

A computation near real time (e.g. less than 3 seconds), so that a user can interactively remove or displace objects in an image.

The invention claimed is:

1. A computer-implemented method for completing an image having at least one hole, the method comprising:
   providing a dictionary of atoms representative of the known pan of the image;
   determining an optimal distribution of atom linear combinations with a process comprising at least one minimization of a respective energy defined on a respective Markov Random Field having nodes and labels, each node corresponding to a respective location of the hole and being associated to a respective label; and
   filling the hole with the optimal distribution,
   wherein the determining implements a top-down approach, and
   wherein the at least one minimization of an energy includes:
   a first minimization, each label of the Markov Random Field respective to the first minimization taking its value within the dictionary of atoms; and then
   a second minimization, each label of the Markov Random Field respective to the second minimization taking its value within a predetermined set of coefficients.

2. The method of claim 1, wherein each label takes its value within a finite set of values, preferably comprising less than 500, 200, 150 or 100 values.

3. The method of claim 1, wherein the process comprises a matching-based algorithm initialized with the result of the at least one minimization and based on patches extracted from the known part of the image.

4. The method of claim 1, wherein the predetermined set of coefficients stems from a K-means clustering of a set of coefficients to be applied to the atoms for producing patches of the known part of the image.

5. The method of claim 1, wherein the energy respective to the first minimization penalizes photometric distortion and/or statistical distortion, and/or the energy respective to the second minimization penalizes photometric distortion and/or statistical distortion.

6. The method of claim 5, wherein the first minimization further penalizes an extent of unrespect of borders of the hole.

7. The method of claim 1, wherein the method then further comprises:
   a third minimization, each label of the Markov Random Field respective to the third minimization taking its value within the dictionary of atoms; and then
   a fourth minimization, each label of the Markov Random Field respective to the fourth minimization taking its value within the predetermined set of coefficients.

8. The method of claim 7, wherein the energy respective to the third minimization penalizes statistical distortion, and/or the energy respective to the fourth minimization penalizes statistical distortion.

9. The method of claim 1, wherein the image is a frame of a video.

10. The method of claim 9, wherein the video further includes one or more other images prior to the image, the method comprising determination of the dictionary of atoms based on the one or more other images.

11. A non-transitory computer readable storage medium having recorded thereon a computer program comprising instructions for performing a computer-implemented method for completing an image having at least one hole, the method comprising:
    providing a dictionary of atoms representative of the known part of the image;
    determining an optimal distribution of atom linear combinations with a process comprising at least one minimization of a respective energy defined on a respective Markov Random Field having nodes and labels, each node corresponding to a respective location of the hole and being associated to a respective label; and
    filling the hole with the optimal distribution,
    wherein the determining implements a too-down approach, and
    wherein the at least one minimization of an energy includes:
    a first minimization, each label of the Markov Random Field respective to the first minimization taking its value within the dictionary of atoms; and then
    a second minimization, each label of the Markov Random Field respective to the second minimization taking its value within a predetermined set of coefficients.

12. The non-transitory computer readable medium of claim 11, wherein each label takes its value within a finite set of values, preferably comprising less than 500, 200, 150 or 100 values.

13. The non-transitory computer readable medium of claim 11, wherein the process comprises a matching-based algorithm initialized with the result of the at least one minimization and based on patches extracted from the known part of the image.

14. The non-transitory computer readable medium of claim 11, wherein the predetermined set of coefficients stems from a K-means clustering of a set of coefficients to be applied to the atoms for producing patches of the known part of the image.

15. The non-transitory computer readable medium of claim 11, wherein the energy respective to the first minimization penalizes photometric distortion and/or statistical distortion, and/or the energy respective to the second minimization penalizes photometric distortion and/or statistical distortion.

16. A system comprising:
    a processor coupled to a memory and a graphical user interface, the memory having recorded thereon a computer program comprising instructions for performing a computer-implemented method for completing an image having at least one hole, the instructions causing the processor to be configured to
    provide a dictionary of atoms representative of the known part of the image,
    determine an optimal distribution of atom linear combinations with a process comprising at least one minimization of a respective energy defined on a respective Markov Random Field having nodes and labels, each node corresponding to a respective location of the hole and being associated to a respective label, and
    fill the hole with the optimal distribution,
    wherein the processor is further configured to implement the determination in a top-down approach, and
    wherein the at least one minimization of an energy includes:
    a first minimization, each label of the Markov Random Field respective to the first minimization taking its value within the dictionary of atoms; and then
    a second minimization, each label of the Markov Random Field respective to the second minimization taking its value within a predetermined set of coefficients.

* * * * *